(12) United States Patent　　(10) Patent No.:　　US 9,155,255 B2
　　Asal　　　　　　　　　　　　　　(45) Date of Patent:　　Oct. 13, 2015

(54) WATER TRANSPORTING LINE AND WATERING DEVICE FOR WATERING POTTED PLANTS

(75) Inventor: Benjamin Asal, Erbach-Ersingen (DE)

(73) Assignee: HUSQVARNA AB, Huskvarna (SE)

( * ) Notice:　Subject to any disclaimer, the term of this patent is extended or adjusted under 35 U.S.C. 154(b) by 0 days.

(21) Appl. No.: 14/128,302

(22) PCT Filed: Nov. 16, 2011

(86) PCT No.: PCT/EP2011/070297
　　§ 371 (c)(1),
　　(2), (4) Date: Dec. 20, 2013

(87) PCT Pub. No.: WO2013/071969
　　PCT Pub. Date: May 23, 2013

(65) Prior Publication Data
　　US 2014/0115962 A1　　May 1, 2014

(51) Int. Cl.
　　*A01G 27/00*　　(2006.01)
　　*A01G 27/04*　　(2006.01)
　　*A01G 29/00*　　(2006.01)

(52) U.S. Cl.
　　CPC .............. *A01G 27/006* (2013.01); *A01G 27/04* (2013.01); *A01G 29/00* (2013.01)

(58) Field of Classification Search
　　USPC ............... 47/81, 79, 80, 48.5, 71, 65.5, 66.6, 47/66.7, 39, 67, 68; 239/547, 145; 222/187
　　See application file for complete search history.

(56) References Cited

U.S. PATENT DOCUMENTS

| | | | | |
|---|---|---|---|---|
| 2,810,235 A | * | 10/1957 | Magid | 47/81 |
| 3,739,524 A | * | 6/1973 | Rose | 47/81 |
| 4,139,159 A | | 2/1979 | Inoue et al. | |

(Continued)

FOREIGN PATENT DOCUMENTS

| | | |
|---|---|---|
| DE | 1064281 B | 8/1959 |
| DE | 2901773 A1 | 7/1980 |

(Continued)

OTHER PUBLICATIONS

International Search Report and Written Opinion of PCT/EP2011/070297 mailed Sep. 5, 2012, all enclosed pages cited.

(Continued)

*Primary Examiner* — Trinh Nguyen
(74) *Attorney, Agent, or Firm* — Nelson Mullins Riley & Scarborough LLP

(57) ABSTRACT

The invention relates to a potted plant watering device and a water transporting line (WL) which is used in said watering device, said transporting line comprising a fibrous material (FB) which makes use of capillary action and comprising a watertight casing (HU) which surrounds the fibrous material in a tubular manner. The fibrous material (FB) and the casing (HU) are formed in a flat manner in the shape of a strip, and the tubular casing (HU) walls (W1, W2) which are formed in a flat manner in the shape of a strip, which lie opposite each other, and which enclose the fibrous material (FB) between each other are designed with different flexural rigidities. The different flexural rigidities are preferably achieved by forming a second casing wall (W2) with a constant wall thickness (DW) from a homogenous material and by increasing the flexural rigidity of the first casing wall (W1) by means of a central strip (MS) consisting of a second material with a greater wall thickness and/or a higher Shore hardness.

20 Claims, 1 Drawing Sheet

(56) References Cited

U.S. PATENT DOCUMENTS

| | | | | |
|---|---|---|---|---|
| 4,339,891 | A | * | 7/1982 | Bassett .................. 47/71 |
| 4,999,947 | A | | 3/1991 | Whitaker |
| 5,193,305 | A | * | 3/1993 | Holtkamp, Jr. ............. 47/81 |
| 5,315,787 | A | * | 5/1994 | Schleicher et al. ............ 47/79 |
| 5,329,729 | A | | 7/1994 | Liang |
| 5,446,994 | A | * | 9/1995 | Chou .................... 47/81 |
| 6,138,411 | A | * | 10/2000 | Lin ..................... 47/79 |
| 6,675,533 | B2 | | 1/2004 | Morlier et al. |
| 6,736,337 | B2 | | 5/2004 | Vildibill et al. |
| 8,528,252 | B2 | * | 9/2013 | Griebel .................. 47/81 |

FOREIGN PATENT DOCUMENTS

| | | |
|---|---|---|
| FR | 2654900 A1 | 5/1991 |
| GB | 654013 A | 5/1951 |
| WO | 2009132380 A1 | 11/2009 |

OTHER PUBLICATIONS

Chapter I International Preliminary Report on Patentability of PCT/EP2011/070297 mailed May 20, 2014, all enclosed pages cited.

* cited by examiner

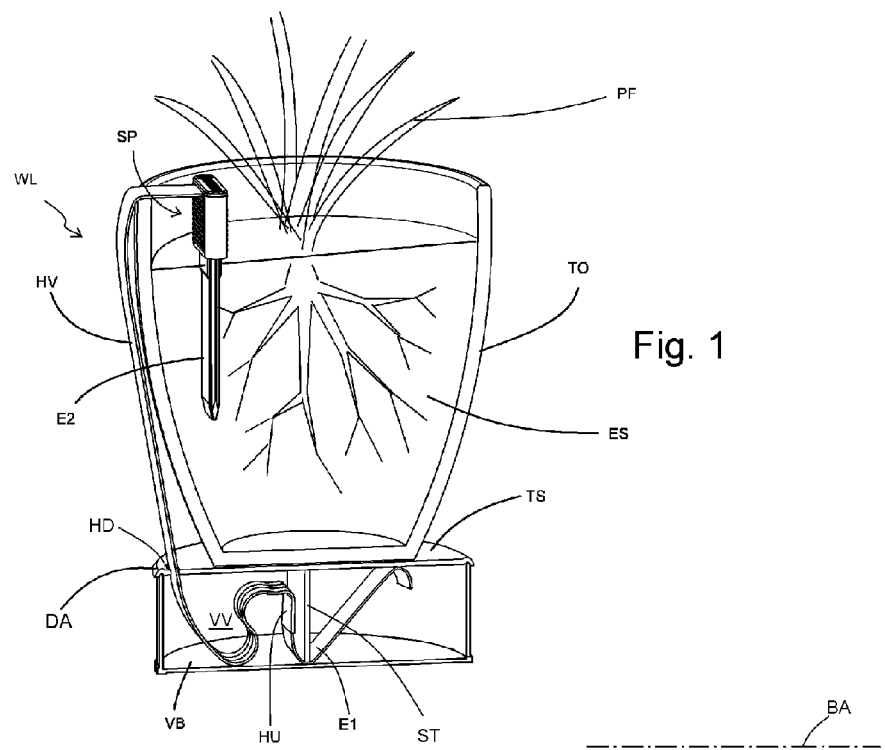
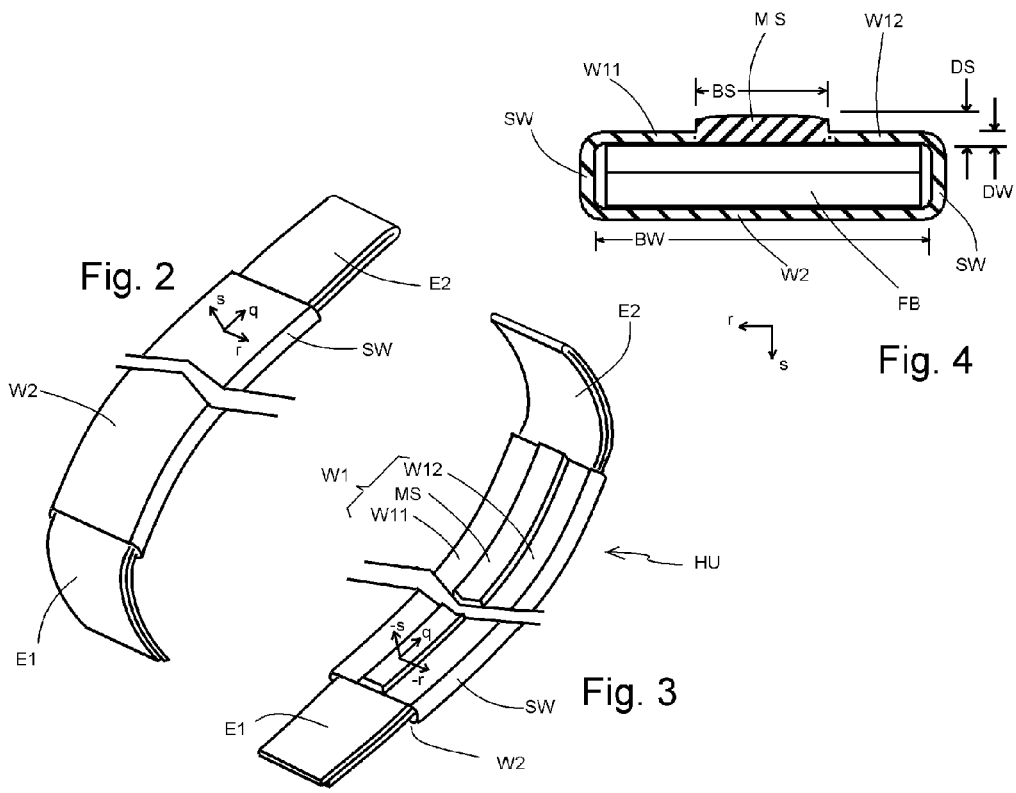

WATER TRANSPORTING LINE AND WATERING DEVICE FOR WATERING POTTED PLANTS

The invention relates to a water transporting line with a fibrous material which works by capillary action as well as watering device for watering the potted plants.

Water transporting lines made of a fibrous material for watering potted plants have been known for a long time for watering potted plants. These lines transport water through capillary action out of a storage tank and into a plant substrate in a plant container at a higher elevation, against the force of gravity, and dispense the water in metered form to the plant substrate.

In the simplest embodiment, such water transporting lines are made of woolen fibers or other fiber strands of household materials, which may also be surrounded by watertight guide casings.

More complex embodiments of watering devices typically have a water storage tank with a lid that forms a pot utility surface. The water transporting line may lead out of this through an opening in the water storage tank and then over the edge of the pot of the potted plant to the plant substrate.

In addition to the fibrous water transporting lines, embodiments in which the fibrous material forms a fiber strand are also known.

U.S. Pat. No. 6,675,533 B2 discloses a pot watering device with wicks surrounded by plastic casings. In the case of a device known from GB 654013 A wicks are surrounded by rubber tubing.

The object of the present invention is to provide an advantageous water transporting line having a fiber strand and a watering device having such a water transporting line.

Inventive approaches are described in the independent claims. The dependent claims contain advantageous embodiments and refinements of the invention.

Due to the design of the opposing sliver-shaped walls of the tubular flexible casing with different flexural rigidities, an advantageous flexural behavior of the tubular casing with a substantially reduced kinking tendency in comparison with casings having casing walls of the same flexural rigidity is advantageously achieved. The reduced kinking tendency leads to an improved aesthetic impression of the watering device and/or ensures a reproducibly reliable transport of water.

The flexural rigidity here and below is understood to refer to the flexural rigidity against bending about a bending axis running parallel to the transverse direction of the casing. The transverse direction is an internal coordinate of the tubular casing. The longitudinal direction, which is variable due to the flexibility of the casing and the surface normal of the first casing wall, which is essentially parallel to the second casing wall, together with the transverse direction, form an internal orthogonal coordinate system which is not fixed in space.

In a first embodiment, the different flexural rigidities of the casing walls may be defined by a greater wall thickness of the first casing wall in comparison with the second casing wall. In another embodiment the first casing wall may have a different material composition than the second casing wall. In particular the first casing wall may be made at least partially of a second material which preferably has a greater material-specific flexural rigidity than a first material of which the second casing wall is made due to a higher coefficient of elasticity. The features of the different wall thicknesses and the different material compositions of the first and second casing walls may advantageously be implemented jointly in that, in a first embodiment, the first and second casing walls are made of the same first material with the same wall thickness, and the first casing wall additionally comprises at least one strip of a second material, which has a higher modulus of elasticity. The at least one strip of the second material may be placed on a continuous layer of the first forming the first casing wall or in a preferred embodiment it may form the wall by itself over a partial width of the first casing wall in the transverse direction.

The increased flexural rigidity is advantageously not in effect over the entire width of the first casing wall but instead is only or to a greater extent in at least one region at a distance from the lateral edges of the first casing wall in the transverse direction. The flexural rigidity of the first casing wall is preferably the greatest at the center, as measured in the transverse direction. The curve of the flexural rigidity of the first transverse wall is preferably symmetrical with respect to a central longitudinal plane in the transverse direction. The flexural rigidity may also be varied continuously in the transverse direction over the width of the first casing wall. One or more regions of increased flexural rigidity are advantageously arranged at a distance from both lateral edges of the first casing wall in the transverse direction.

In a preferred embodiment, a strip of a second material, which is at a distance of at least 20%, in particular at least 30%, of the width of the first casing wall from its lateral edges is provided at the center of the first casing wall in the transverse direction. The strip of the second material preferably has a greater thickness than the regions of the first casing wall of the first material surrounding it on both sides. The second material preferably has a higher Shore hardness than the first material. The Shore hardness of the first material advantageously has a value of less than 70 Shore, in particular less than 60 Shore, and the second material has a hardness of more than 80, in particular more than 90.

The casing is preferably embodied as an extruded plastic section, whereby various materials may advantageously be used in an essentially conventional two-component method in one operation and be bonded fixedly to the base surfaces.

The fiber sliver is exposed on opposite ends of the casing on the water transporting line to absorb water from a water storage tank at a first end and to dispense water to a plant substrate at a second end. A ground spike which can preferably be inserted into the plant substrate, is arranged at the second end and is connected mechanically to the casing. The ground spike advantageously determines the course of the water transporting line with a preferred width and at least predominant bending direction in which the first casing wall faces the bending axis for use of the water transporting line in a watering device between the ground spike and the water storage tank.

The invention is illustrated in greater detail below on the basis of preferred exemplary embodiments with reference to the figures, which show:

FIG. 1 a potted plant watering device,
FIG. 2 a water transporting line,
FIG. 3 the water transporting line according to FIG. 2 in a different view,
FIG. 4 a cross section through a water transporting line.

FIG. 1 shows a partially sectional view of a potted plant watering device, which includes a plant pot TO having a plant PF with roots in a plant substrate ES. The plant pot TO is placed on a utility surface TS of the lid of a water storage tank. The water storage device has a storage volume VV in a pot-shaped storage tank VB. The storage tank VB is covered by a lid arrangement DA. A water transporting line WL is guided through a bushing HD in the lid arrangement DA, out of the storage volume VV and to a ground spike SP which is inserted together with a tip into the plant substrate ES. The water transporting line WL includes in particular a watertight and preferably also vapor-proof casing HU and, inside of this, namely a fiber strand in the example illustrated here, which is lengthened at both ends beyond the casing HU and which transports water on the basis of capillary action against the force of gravity and is in contact at its first exposed end E1 with water in the storage tank VB to absorb water, and at a second exposed end E2 is in contact with the plant substrate ES at the ground spike to release water to the plant substrate. Through a web ST protruding downward from the utility surface TS of the lid arrangement DA into the storage volume VV, it is ensured that at least one portion of the exposed first end E1 of the fiber strand will still be in contact with water even when there is a low water level in the storage tank.

The casing HU advantageously extends in the longitudinal direction of the water transporting line WL as far as the end of the ground spike SP, where it is secured mechanically, for example, being clamped, such that the clamping is of a type to hold the casing HU tightly on the ground spike SP but without having any negative effect on the transport of water through the fiber strand. The connection of the casing HU to the ground spike SP is preferably such that the ground spike SP with an insertion opening for this casing HU forms a defined alignment of the ground spike in relation to the upper edge of the plant pot TO.

The water transporting line is designed in a flat form and is thus connected to the ground spike SP, so that, due to its predetermined orientation to the edge of the plant pot TO, a defined allocation of a first flat casing wall of the casing HU in its path between the ground spike SP and the bushing HD through the lid arrangement DA of the water storage tank to the plant pot TO is defined at the same time. The flat second casing wall of the flat casing HU lying opposite the first casing wall then faces away from the plant pot TO in the course of the casing from the ground spike SP to the bushing HD in the lid arrangement DA. Due to the orientation of the casing walls of the casing HU which is thereby predetermined, the predominant direction of curvature of the curved path of the water transporting line WL and/or of the casing HU in the second between the ground spike SP and the bushing HD is defined so that the axis of bending of a curvature of the casing HU which is averaged from the ground spike SP to the bushing HD and which runs counterclockwise in the example outlined here, is situated on the side of the casing HU facing the plant pot and thus the first casing wall of the casing HU faces such an axis of bending of an average curvature and the second casing wall of this bending axis which is obliquely visible in FIG. 1 in the course between the ground spike SP and the bushing HD faces away from an average curvature.

Due to the greater flexural rigidity of the first casing wall facing the plant pot TO in FIG. 1 according to the invention in comparison with the casing wall of the casing HU facing away from the plant pot TO the result is an advantageous flexural behavior in which the casing wall facing the plant pot and having the higher flexural rigidity prevents a sharp kinking of the water transporting line, and despite its continued flexibility, the water transporting line assumes an essentially kink-free course. In particular due to the alignment of the first casing wall with the higher flexural rigidity to the axis of bending of the average curvature, this prevents the casing wall which faces the bending axis from becoming inverted away from the fiber sliver when there is a narrow bending radius.

FIG. 2 shows a detail of a water transporting line wherein the dimensions of the casing HU and of the first end E1 and of the second end E2 of the fiber sliver FB are not to be understood as quantitative. For the casing HU an interruption indicates that the total length of the casing HU is greater than that shown. The first end E1 and the second end E2 are typically much longer than in the diagram according to FIG. 2 in relation to the thickness and transverse dimension of the casing HU and of the fiber sliver.

The fiber sliver FB is assumed to be two layers in the example diagramed here, wherein a deflection of the sliver is to be provided on the second end E2 of the fiber sliver so that both layers are part of a cohesive fiber sliver in one piece.

FIG. 2 shows an inclined view of the second casing wall W2 of the casing. FIG. 3 shows the water transporting line according to FIG. 2 in a view of the first casing wall W1 of the casing HU. FIG. 4 shows a sectional view in a sectional plane perpendicular to the longitudinal course of the water transporting line.

FIGS. 2 through 4 show an internal orthogonal coordinate system having the coordinates q, r and s for the water transporting line, in particular the casing HU. The coordinate q denotes the longitudinal direction of the casing HU. The coordinate direction h is designated as the transverse direction which runs at a right angle to the longitudinal direction q and parallel to the surfaces of the flat sliver-like casing walls W1 and W2 of the fiber sliver FB. The coordinate s runs parallel to the direction of the surface normals of the surfaces of the flat casing walls W1, W2 and/or of the fiber sliver FB. Based on the flexibility of the water transporting line, the coordinates q, r, s are to be regarded only as internal coordinates within the water transporting line, their direction in space being variable depending on the orientation of the water transporting line. For the present invention, the bending of the water transporting line WL and/or of the casing HU is understood to refer only to bending about the bending axes that run parallel to the transverse direction r. Torsion of the sliver about the longitudinal direction r is possible but is not particularly important for the present invention. Bending about a bending axis, which is parallel to the coordinate direction s, is precluded from consideration because of the great extent of the casing walls W1, W2 in the transverse direction r.

The casing HU has an approximately rectangular internal cross section in which the fiber sliver FB preferably lies under a slight elastic prestress in the normal direction s. The flat ribbon-shaped casing walls W1 and W2 running parallel to one another and on both sides of the fiber sliver FB in the normal direction s are joined together by means of side walls SB at their edges, which are opposite one another in the transverse direction r and are supplemented to form a closed tubular casing.

The second casing wall W2 has an essentially constant wall thickness DW in the transverse direction, which is assumed to be equally large for the lateral regions of the first casing wall W1 and is labeled as DW in FIG. 4. An increased flexural rigidity of the first casing wall W1 in comparison with the second casing wall W2 is achieved in the example diagramed here by the fact that in the partial regions W11, W12 facing the opposing edges in the transverse direction, the first casing wall is constructed with the wall thickness DW which is the same as the wall thickness W2, and is made of the same material. In a central region, which is enclosed by the two partial regions W11, W12 and is at a distance from the two edges of the second casing wall in the transverse direction, the first casing wall is formed by a strip MS of a second material and has a greater wall thickness DS in comparison with DW. In addition to having the greater wall thickness DS, the second material preferably also has a greater Shore hardness than the first material of the casing wall W2. The width BS of the strip-shaped central region MS advantageously amounts to at least 20%, in particular at least 30% of the width BW of the first and second casing walls. The width BW is advantageously no greater than 60% of the width BW of the casing walls W1, W2, in particular no greater than 50%. The hardness of the first material amounts to approx. 55 Shore, for example, and that of the second material is approx. 95 Shore.

With regard to FIG. 4, the position of a bending axis BA on the side of the first casing wall of the tubular casing is also plotted as an example. At a bending of the casing HU about such a bending axis BA, the casing with the flexurally rigid central strip MS in the first casing wall and with the low flexural rigidity in the lateral regions W11, W12 of the first casing wall and the likewise lower flexural rigidity in the second casing wall may advantageously assume a deformation such that there is a curvature in the casing cross section about the longitudinal direction which is perpendicular to the drawing in FIG. 4, and the side walls SW are shifted in the direction of the bending axis BA in the course of the bending. The increase in flexural rigidity here which is limited to or concentrated on a central region MS of the first casing wall is particularly advantageous.

The wall thickness of the side walls SW which are assumed to be homogeneous with regard to the material of the second wall W2 and the partial regions W11, W12 of the first casing wall is shown in the example diagramed in FIG. 4 as being equal to the second casing wall W2 and the partial regions W11, W12 but it may also be different from this.

The manufacture of a tubular flexible casing according to FIG. 4 may take place in a preferred embodiment in the form of a two-component extruded method on elastic plastic materials wherein the first material for partial regions W11, W12, side walls SW and second casing wall W2 on the one hand and the second material for the central strip MS are fixedly joined to one another from the beginning at the interfaces between MS and W11 and/or W12.

The features described above and in the claims as well as those that can be derived from the figures can be implemented advantageously either individually or in various combination. The invention is not limited to the exemplary embodiments described here but instead may be modified in a variety of ways within the scope of technical expertise.

The invention claimed is:

1. A water transporting line for watering potted plants by transporting water in accordance with the capillary effect in fibrous material, wherein
   the fibrous material is in the form of a flat fiber sliver,
   the fiber sliver including the fibrous material disposed between opposing ends of the fiber sliver, the fibrous material being surrounded by a tubular waterproof flexible casing with a flat inside cross section, wherein a shape of the casing determines a longitudinal direction of the casing, a surface normal direction and a transverse direction, which is orthogonal to the longitudinal direction and the surface normal direction,
   the ends of the fiber sliver contact water in a water storage tank and a plant substrate, respectively,
   the casing comprises a first sliver-shaped casing wall and a second sliver-shaped casing wall between which the fiber sliver runs and which form the watertight casing together with narrow side walls,
   the first casing wall has a higher flexural rigidity than the second casing wall against bending about a bending axis running in the transverse direction.

2. The water transporting line according to claim 1, wherein the increased flexural rigidity of the first casing wall is achieved by a strip arrangement having at least one strip running in the longitudinal direction, its width being less than the width of the first casing wall.

3. The water transporting line according to claim 2, wherein the width of the at least one strip or, in the case of multiple strips, their cumulative width is less than 60% of the width of the first casing wall.

4. The water transporting line according to claim 2, wherein the strip arrangement in the transverse direction is symmetrical with the central longitudinal plane of the first casing wall.

5. The water transporting line according to claim 1, wherein the first casing wall has a greater wall thickness in comparison with the second casing wall in at least a portion of the first casing wall along the transverse direction.

6. The water transporting line according to claim 5, wherein the greater wall thickness amounts to at least 1.5 times the wall thickness of the second casing wall.

7. The water transporting line according to claim 1, wherein the first casing wall has a different material composition in at least a portion of the first casing wall along the transverse direction than a material of the second casing wall.

8. The water transporting line according to claim 7, wherein the first casing wall is at least partially homogeneous, with regard to the material, with the second casing wall, which is made of a first plastic material and additionally contains at least one second plastic material in the portion of the first casing wall along the transverse direction.

9. The water transporting line according to claim 8, wherein the second plastic material has a higher Shore hardness than the first plastic material.

10. The water transporting line according to claim 9, wherein the second casing wall is formed only by the second plastic material the portion of the first casing wall along the transverse direction of the first casing wall.

11. The water transporting line according to claim 7, wherein the casing is designed as one-piece plastic tubing manufactured by the two-component extrusion method.

12. The water transporting line according to claim 1, wherein the fiber sliver is constructed of at least two layers.

13. The water transporting line according to claim 1, wherein on one end of the casing a ground spike is attached, wherein an unenclosed section of the fiber strand is present on one end of the casing.

14. A watering device for potted plants having a water transport line for watering potted plants by transporting water in accordance with the capillary effect in fibrous material, wherein
   the fibrous material is in the form of a flat fiber sliver,
   the fiber sliver comprising fibrous material disposed between opposing ends of the fiber sliver, the fibrous material being surrounded by a tubular waterproof flexible casing with a flat inside cross section, wherein a shape of the casing determines a longitudinal direction of the casing, a surface normal direction and a transverse direction, which is orthogonal to the longitudinal direction and the surface normal direction,
   the casing comprises a first sliver-shaped casing wall and a second sliver-shaped casing wall between which the fiber sliver runs and which form the watertight casing together with narrow side walls,
   the first casing wall has a higher flexural rigidity than the second casing wall against bending about a bending axis running in the transverse direction,
   wherein a first end of the fiber sliver extends into a water storage volume of a water storage container and a second end of the fiber sliver for dispensing water is formed on a plant substrate which is situated above the level of the water storage volume and at least one section of the fiber sliver running outside of the water storage container up to the second end is surrounded by the casing.

15. The watering device according to claim 14, wherein the casing passes through a bushing in the water storage device and can be displaced in relation to the bushing in the longitudinal direction and this can be arranged with a stowage section inside the water storage container.

16. The watering device according to claim 14, wherein the water transporting line runs with a curvature outside of the water storage container and has a predominant direction of curvature, with a first casing wall being in contact with the inside of this direction of curvature and facing a bending axis of a curved path.

17. The water transporting line according to claim 1, wherein the tubular waterproof flexible casing comprises a substantially rectangular cross section.

18. The water transporting line according to claim 1, wherein the first casing wall and second casing wall run parallel to each other to side walls that join the first and second casing walls to form the casing as a flat ribbon-shaped casing.

19. The watering device according to claim 14, wherein the tubular waterproof flexible casing comprises a substantially rectangular cross section.

20. The watering device according to claim 14, wherein the first casing wall and second casing wall run parallel to each other to side walls that join the first and second casing walls to form the casing as a flat ribbon-shaped casing.

\* \* \* \* \*